Figure 1:
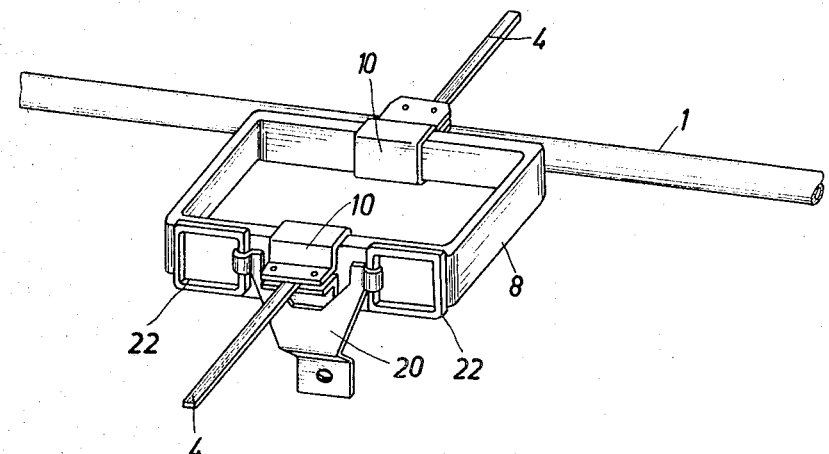

Feb. 21, 1967          T. GAST          3,305,035

ELECTRICAL WEIGH SCALE WITH MOVING-COIL DETECTOR

Filed Aug. 27, 1965

INVENTOR
Theodor Gast

BY *Otto John Munz.*

ATTORNEY

United States Patent Office 3,305,035
Patented Feb. 21, 1967

3,305,035
ELECTRICAL WEIGH SCALE WITH MOVING-COIL DETECTOR
Theodor Gast, Berlin, Germany, assignor to Sartorius-Werke (und vormals Gottinger Prazisionswaagenfabrik G.m.b.H.) AG
Filed Aug. 27, 1965, Ser. No. 483,277
Claims priority, application Germany, Aug. 31, 1964, S 92,927
9 Claims. (Cl. 177—185)

This invention relates to an electronic micro-scale provided with indicating means for an inductive indication of the position of the scale beam and automatic compensating means. Such scales have been disclosed by the German patent specifications 914,445 and 1,035,371. In these scales, a homogeneous unidirectional field pulsating at high frequency is produced by field coils alone or by a permanent magnet on which a field coil is wound. The scale beam is suspended by torsion springs and at its suspension point is firmly connected to a moving coil. The torsion springs serve also as supply conductors for the moving coil. When the scale beam is in position of rest, the coil plane is parallel to the field lines of the pulsating unidirectional field. The application of a load to the scale beam causes the moving coil to rotate to a position in which it is oblique with respect to the field lines so that the high frequency coil induces a high frequency signal in the moving coil. The amplitude of this signal depends in magnitude and sign on the angle through which the coil has been moved. In an apparatus which is described in the German patent specification 914,445, this signal is amplified, subjected to phase-sensitive rectification, re-amplified and then returned into the moving coil.

The resulting torque reaction is proportional to the product of the field strength of the permanent magnet and the direct current. The field strength of the permanent magnet being constant, the reaction torque must be exactly proportional to the current. This current is indicated by an instrument, which is incorporated in the apparatus, and is a measure of the torque which acts on the scale beam or of the weight to be determined.

According to the German patent specification 1,035,371 a permanent magnet consisting of a virtually non-permeable material, such as a high-coercivity ferrite, is used. A field winding which is energized by a high frequency current is mounted on the magnet. The magnetic field of this winding acts on the moving coil, which is secured to the scale beam. Eddy currents are induced in the magnet itself and have an undesirable reaction on the field winding and the moving coil. More particularly, the Q of the field coil is reduced and the frequency stability of the energizing voltage is adversely affected.

The eddy currents induce in the moving coil an interference signal, which is poorly defined in amplitude and phase. The higher the reluctivity of the magnetic material, the less are these undesired secondary effects. For the reliability of operation and accuracy of measurement, it is essential that the material is virtually non-permeable. It is an object of the present invention to provide an arrangement in which the permeability or reluctivity of the magnetic material is less critical for the measurement so that a more reliable function and a higher accuracy of measurement can be achieved. In an electronic micro-scale of the type described hereinbefore, this is achieved according to the invention by the provision of two identical framelike field coils, which are arranged to be supplied with alternating current in opposite senses, and arranged closely beside the moving coil, symmetrically with respect to the axis, and symmetrically and at right angles with respect to the mean major plane of the moving coil.

Thus, the A.C. field coils are not wound on the permanent magnet but are mounted in a stationary position beside the moving coil, independently of the permanent magnet.

Thus, the high frequency magnetic field of these coils is influenced only to a small degree by the magnetic material because the magnet is disposed outside the region of the highest field strength. This reduces the current value of the induced eddy currnts as well as the coupling between these currents and the field winding and moving coil. This reduces the significance of the reluctivity of the permanent magnet.

The field in which the moving coil is disposed may be increased if the magnetic circuit is closd by ferrite or other magnetic matrial. This will not significantly interfere with the high frquency field.

The moving coil may be generally of any desired configuration and the A.C. field coils may be disposed at any desired point of the periphery of said coil, provided that the above-mentioned requirement is met.

When the moving coil is symmetrically disposed with respect to the field coils, the A.C. voltages produced in the turns of the moving coil will balance each other. If the moving coil is rotated about its axis, e.g., about the torsion spring by which it is suspended, a signal is produced in the moving coil; this signal is proportional to the angle of rotation in a first approximation. No signal will be produced in response to a translation of the moving coil in any undesired direction.

In a development of the invention, the moving coil has rectangular turns and the A.C. field coils are disposed beside one end face of the moving coil. In this case, the A.C. field coils may be disposed very close to the moving coil because the end faces of the moving coil move parallel to the planes of the field coils during the rotation of the moving coil.

The field coils may be disposed at an inner or outer end face of the moving coil. To ensure that the distance from the field coils to the permanent magnet disposed in the moving coil is as large as possible, the A.C. field coils are preferably disposed near an outer end face of the moving coil.

Figure 2:
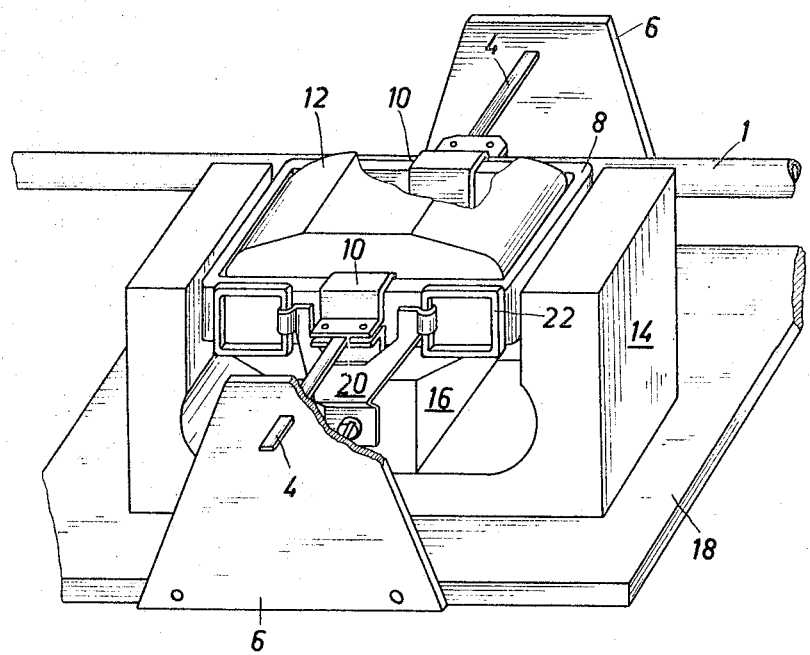

An illustrative embodiment of the invention will now be described with reference to the accompanying drawing, in which FIG. 1 is a perspective view showing the moving coil, which is connected to the scale beam, and the A.C. field coils, FIG. 2 shows the arrangement of these elements in the magnetic system.

Only the central portion of a scale beam 1 is shown. This beam carries at one end a hook or another articulated joint for receiving a load and at the other end a counter-weight. With the aid of two torsion springs 4, the beam is suspended from stationary frame members 6 so that it is pivotally movable about the axis of the springs 4. The springs 4 are secured in the frame members 6 by means which are not shown. A moving coil 8 is non-rotatably connected to the scale beam 1 and the springs 4 by means of clips 10. The springs 4 serve for supplying current to the moving coil 8.

A stationary permanent magnet 12 is disposed in the moving coil. This permanent magnet has a horizontal magnetization so that one pole is disposed on the left and the other pole on the right in FIG. 2. The magnetic circuit is closed by a substantially channel-shaped member 14 of a magnetically permeable material. A web 16, which carries the magnet 12, is secured to the underside of member 14 at the center thereof. Member 14 and frame parts 6 are secured to a baseplate 18.

A mounting plate 20 is secured to the web 16. The upper portion of this plate is spaced from the end face of the magnet 12 and extends parallel thereto. Thus, there is a space for the moving coil 8 between the magnet 12 and the mounting 20. The mounting carries the two A.C. field coils 22, the planes of which are parallel to the front end face of the moving coil 8 in FIG. 2.

What is claimed is:
1. An electronic micro-scale, which comprises a moving coil, which has a mean major plane and is arranged to rotate about an axis in response to the application of a load to said scale, indicating means for an induced indication of the position of said moving coil, and automatic compensating means, said automatic compensating means comprising a permanent magnet for producing a unidirectional field, said magnet consisting of low-permeability material and disposed in said moving coil, and said indicating means comprising two stationary, identical framelike field coils, which are disposed closely beside said moving coil and symmetrically with respect to said axis and symmetrically and at right angles with respect to said mean major plane, said field coils being connected to be flown through by alternating current in opposite senses.
2. A scale as set forth in claim 1, in which said moving coil has rectangular turns defining end faces of said moving coil and said field coils are disposed beside one of said end faces.
3. A scale as set forth in claim 1, in which said moving coil has rectangular turns defining an outer end face of said moving coil and said field coils are disposed beside said outer end face.
4. A scale as set forth in claim 1, which comprises magnetically permeable material magnetically connecting opposite poles of said permanent magnet.
5. A scale as set forth in claim 1, in which said field coils are disposed outside said moving coil.
6. A scale as set forth in claim 1, in which said permanent magnet has opposite poles on opposite sides of said axis.
7. A scale as set forth in claim 1, in which said moving coil has a face which is rotatable in a plane and said field coils are disposed adjacent and parallel to said face.
8. A scale as set forth in claim 1, in which said field coils are connected in opposition to each other.
9. A scale as set forth in claim 1, in which said field coils are connected in series opposition.

References Cited by the Examiner
UNITED STATES PATENTS

| | | | |
|---|---|---|---|
| 2,832,535 | 4/1958 | Sherman | 177—31 |
| 2,874,951 | 2/1959 | Gilbert | 177—210 |
| 2,914,310 | 11/1959 | Bahrs | 177—185 X |
| 3,203,494 | 8/1965 | Roberts | 177—210 X |

RICHARD B. WILKINSON, *Primary Examiner.*

R. S. WARD, JR., *Assistant Examiner.*